Figure 1:
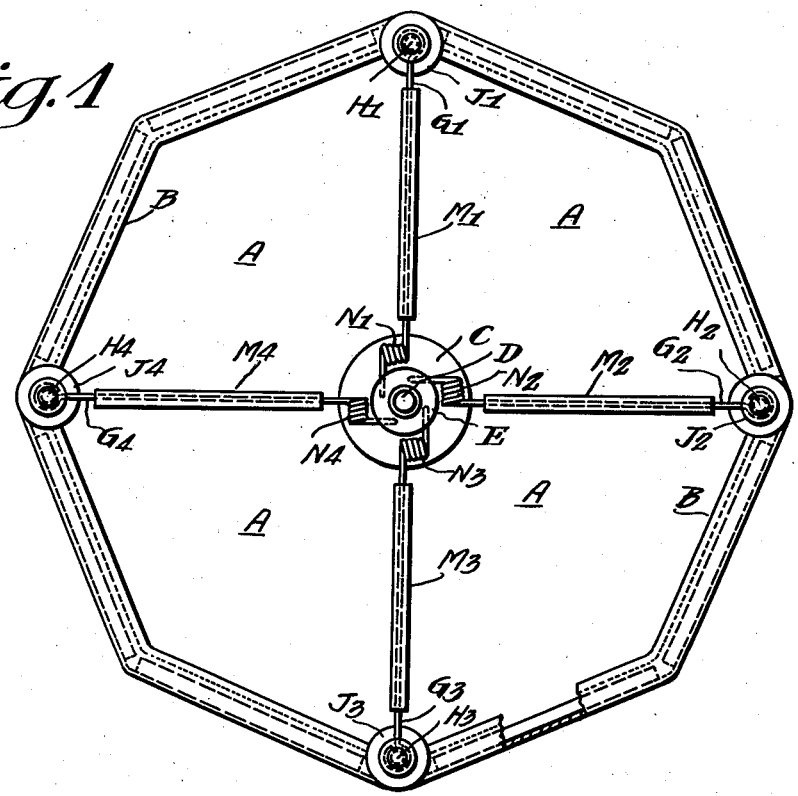

Aug. 6, 1940.   W. D. VAN DYKE   2,210,389
REELABLE ANTENNA SYSTEM AND APPARATUS FOR AIRCRAFT
Filed March 31, 1939   2 Sheets-Sheet 1

Inventor
William D. Van Dyke
By
Attorney

Aug. 6, 1940.   W. D. VAN DYKE   2,210,389
REELABLE ANTENNA SYSTEM AND APPARATUS FOR AIRCRAFT
Filed March 31, 1939   2 Sheets-Sheet 2

Inventor
William D. Van Dyke
By J. Huff
Attorney

Patented Aug. 6, 1940

2,210,389

UNITED STATES PATENT OFFICE 2,210,389

REELABLE ANTENNA SYSTEM AND APPARATUS FOR AIRCRAFT

William D. Van Dyke, Riverton, N. J., assignor to Radio Corporation of America, a corporation of Delaware Application March 31, 1939, Serial No. 265,273

7 Claims. (Cl. 250—33)

My present invention relates to reelable antenna systems for aircraft and has special reference to the provision of an improved drag therefor.

The prior art dictates the use either of a weighted bob or a wind sock on the free end of an aircraft antenna to ensure rapid unreeling. The usual weight of a bob is about two or two and one-half pounds. In spite of extreme precautions, instances have arisen where the weight has broken off in flight, due to twisting or whipping of the antenna, or to other less obvious causes. The serious consequences of such a weight striking an animate or inanimate object after falling from a height of several thousand feet are apparent.

Another less serious but nevertheless real disadvantage in the use of an antenna weight is that in installations employing the same the antenna cannot be directed upwardly or rearwardly within the aircraft but must pass through a straight conduit or fairlead directly through the floor of the plane.

While drag socks possess the advantage of light weight and are non-lethal when dropped, they too possess the disadvantage of requiring straight conduits. Where, as is usually the case, the conduit extends to the stern of the craft, other apparatus and equipment must be placed out of the path of the conduit, since it is almost a physical impossibility to reel an antenna wire through a conduit containing bends against the drag of any wind sock with which I am familiar. This is so because such wind socks are subject to a drag which increases with the square of the velocity. Where linear conduits are employed such "square law drags" are undesirable not only because of the added strain upon the operator and upon the reel, but because of their tendency to slow down the speed of the aircraft. In this latter connection, it has been said that a reduction of one mile per hour in the speed of the planes traveling certain established routes in the United States would cost the operating company approximately $50,000.00 per year. This may account at least in part for the use of antennae, on some commercial airlines, having electrical characteristics which are less satisfactory than reelable antennae.

Accordingly, an object of my present invention is to provide a satisfactory non-lethal substitute for the weighted bobs heretofore employed on aircraft antenna.

Another object of my invention is to provide an improved light-weight drag for aircraft antenna, and one capable of maintaining the drag on the antenna system, and hence upon the aircraft, at a substantially constant value irrespective of the velocity of the air stream.

Another and important object of the invention is to provide an aircraft antenna system wherein the antenna wire may be led through a nonlinear conduit which may traverse a tortuous path of substantially any curved contour from the reel to any desired point on the craft without seriously increasing the drag or other strain upon the reel or its operator.

Still another object of my invention is to provide a simple, inexpensive, rugged and trouble-free drag for aircraft antenna.

Figure 2:
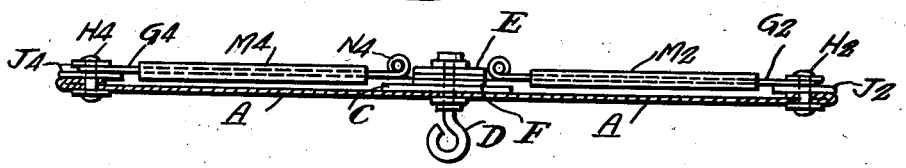
Figure 5:
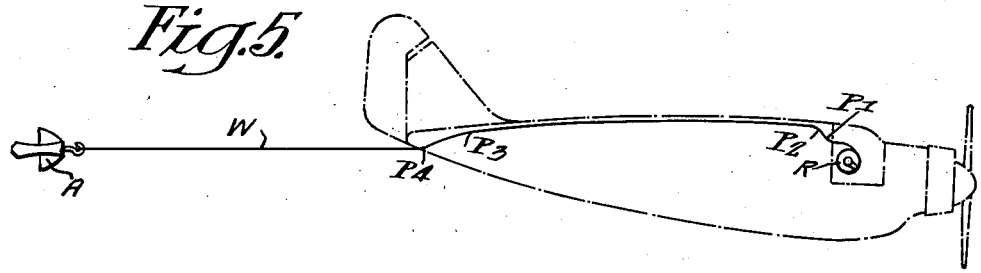
Figure 3:
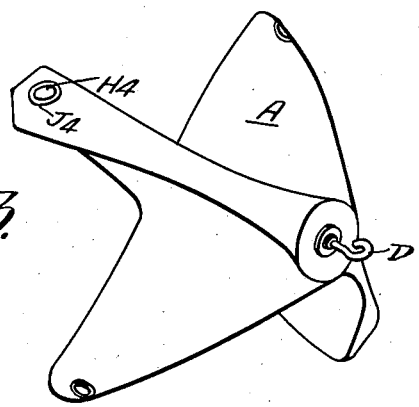
Figure 4:
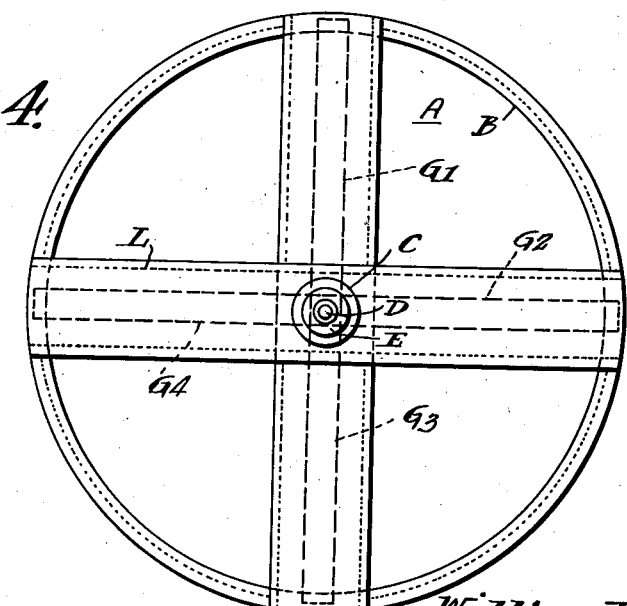

Other objects and advantages, together with certain preferred details of construction will be apparent, and the invention itself will be best understood by a reference to the following specification and to the accompanying drawings, wherein:

Figure 1 is a rear plan view of an antenna drag constructed in accordance with the principle of my invention, Figure 2 is a sectional view taken on the line 2—2 of Fig. 1, Figure 3 is a view in perspective showing the leading surface of the device of Figs. 1 and 2 when subject to an air stream of high velocity, Figure 4 is a rear plan view of a simplified embodiment of the invention, and Figure 5 is a schematic view of an aircraft showing a typical installation.

In the drawings, wherein like reference characters designate the same or corresponding parts in all figures, A designates generally a drag element or surface which may comprise a preferably uniformly shaped sheet of a diameter of, say, 5 inches, and composed of canvas, silk or other strong fabric which is substantially impermeable to air. The edge or edges of the surface may be reinforced, if necessary, or desirable, by a hem B. The fabric or other surface A is provided at its center with a leather or other, preferably flexible, reinforcement C. A swivel attachment D for the antenna wire (W, Fig. 4) extends from the front to the rear of the device through the surface A and reinforcement C. A pair of clamping plates E and F (see Fig. 2) comprise a bearing for the swivel D and serve as a combined clamp, spacer and central support for a plurality of radial metal rods or arms G1, G2, G3, G4, respectively, which extend to preferably equally spaced points on the circumference of the surface A. Rivets H1, H2, etc. (Figs. 1, 2 and 3) and preferably flexible reinforcements J1, J2, etc., may serve to secure the surface A to the flexible arms G1 to G4, inclusive. The fabric A may be attached to the several arms G throughout their length, as by sewing, as indicated at L, Fig. 4, or they remain unattached as in the embodiment of the invention shown in Figs. 1, 2 and 3. In the latter case flexible tubes M1, M2, etc., may be provided about the respective arms to prevent cutting or abrasion of the fabric when it is urged thereagainst by the force of the air stream.

The flexibility of the arms or rods may be uniform throughout their length, as in the embodiment of the invention shown in Fig. 4, or their flexibility may be confined to or enhanced adjacent the respective inner ends as by the provision of a spirally wound or other spring N adjacent each of the respective adjacent inner arm-ends. The bias of these arms G and springs N is exerted outwardly and tends to maintain the drag surface A in a plane which is substantially normal to the direction of the air stream. When the force exerted on the drag surface A by the air stream is of sufficient intensity to overcome or partly overcome the biasing force exerted thereon by the springs N1, N2, etc., and arms G1, G2, etc., these arms and the fabric thereon will be folded or flexed rearwardly so that the device will assume a contour similar to that of a collapsed umbrella, as indicated in Fig. 3.

Without in any wise limiting my invention to any theory of operation, I may say that, in my opinion, the constant drag characteristic of the device above described may be attributed to the fact that, when presented to the air stream, the angle of attack of the drag surface A is disproportionately altered with respect to the angle of attack of the arms G which comprise the frame, whereby the overall drag of the device becomes a non-square function of its velocity. By way of explanation: It is known that the parasitic drag on any surface increases substantially as the square of the velocity. It is also known that the drag on a plane surface is almost a linear function of its angle of attack. Consequently, drag means depending solely on change of angle of attack can never become constant with varying aircraft speeds. However, it will be seen that in the device of my invention such a relationship is possible due to the fact that with a change in angle of attack of the spring supporting arms of only 45° the fabric or other drag surface will complete a change in angle of attack of 90°. It is accordingly believed that it is this property of the device that ensures an almost constant drag throughout wide ranges of aircraft speed.

In calculating the performance of the device of the invention it was deemed advisable to establish two conditions, namely, 80 miles per hour or 117.3 feet per second and 160 miles per hour or 235 feet per second. For the device illustrated in Fig. 4, wherein it will be noted that the arms comprise flat instead of round strips of metal, as in the device of Fig. 1, the drag was computed as follows:

K=drag in pounds,
S=area in square feet,
$C_d$=drag coefficient—$C_d$=1.1 for small circular discs,
$q$=impact pressure=$\frac{1}{2}p_0V^2$,
$p_0$=standard air density=.002378,
V=velocity in ft./sec.

Since $K = C_d qS$ then for standard air density at a velocity of 80 miles per hour or 117.3 feet per second—$q$=15.

As $C_d$ for circular discs=1.1 then $K = 1.1 \times 15 \times S$ and when S=.15 sq. ft. $K = 1.1 \times 15 \times .15$ or K=2.48 lbs. at 80 miles per hour. For drag at any other air density $q$ is, of course $$q = q\frac{p}{(p_0)}$$

When the fabric in its collapsed condition, at a speed of 80 miles per hour, has an angle of attack of approximately 45°, the actual drag is about 50 per cent. of the above figure or 1.24 lbs., to which must be added the drag due to skin friction which is approximately .2 lb. at any condition, or a total drag of 1.44 lbs.

If the bending strength of the radial arms is such that the impact pressure causes them to collapse to about 45° at 160 miles per hour, the fabric itself at this speed would be parallel to the flow of air. Under these conditions the drag was computed as follows:

$C_d$ for rectangles=1.2
Area of vanes=.026 square feet
$q$=.0011×55, 225=60
then since $K = C_d qS$
$K = 1.2 \times 60 \times .026 = 1.872$ Since angle of attack equals 45° the actual drag is about half of this figure or .94 lb.

To this figure must, of course, be added the drag due to skin friction, which is approximately .8 lb. at this speed, resulting in a total drag of 1.74 lbs. Other considerations such as the drag on the antenna wire, swivel and so forth, should actually increase this figure somewhat.

Under actual test in an aircraft the drag was found to increase to only about 1.10 lbs. with a change in aircraft speed from 80 to 150 miles per hour.

As previously set forth reelable antenna installations with which I am familiar require straight conduits and fairleads for directing the antenna wire to its point of departure from the aircraft. Why this is so will be apparent when one visualizes what happens when a strong pulling force is applied to a wire which extends through a conduit having more than one bend therein. In that case the friction throughout the conduit increases to a relatively high value due to the snubbing action introduced by the bends in the conduit. When the drag on the end of the wire increases above a few ounces, as it does when known drag devices are employed, the snubbing action or resistance adjacent the bends is intensified and it becomes practically impossible to reel in the wire without reducing aircraft speed.

The device of my invention, because of its constant drag characteristic, permits the use of an antenna conduit which follows a path of substantially any desired contour. Thus referring to Fig. 5, the path of the antenna wire W from the reel R may be bent at any desired point, as indicated at P1, P2, etc. to permit the conduit through which the wire passes to be "snaked" through the fuselage or through the upholstery or around other equipment.

Various modifications of my invention will suggest themselves to those skilled in the art. It is to be understood therefore that the foregoing is to be interpreted as illustrative and not in a limiting sense except as required by the prior art and by the spirit of the appended claims.

I claim as my invention:

1. A device of the character described comprising a foldable drag surface, biasing means tending to unfold said surface, and means for presenting said surface to an air stream flowing in a direction counter to the direction of the force of said biasing means.

2. A device of the character described comprising a collapsible frame, a foldable drag surface on said frame, biasing means tending to open said frame and unfold said drag surface, and means for presenting said surface to an air stream flowing in a direction counter to the direction of the force of said biasing means.

3. A device of the character described comprising a substantially plane surface comprised of foldable material, means secured adjacent the center of said surface for presenting it to an air stream, and biasing means tending to maintain said surface in its plane against the force of said air stream.

4. A device of the character described comprising a substantially plane surface comprised of foldable material, means secured adjacent the center of said surface for presenting it to an air stream, a plurality of flexible arms extending radially from said center and comprising a support for said surface, and means including said flexible arms for exerting a biasing force upon said surface and tending to maintain it in its plane against the force of said air stream.

5. A device in accordance with claim 4 and wherein the flexibility of said arms is substantially uniform throughout their length.

6. A device in accordance with claim 4 wherein spring means are provided adjacent the inner terminals of said arms for increasing the intensity of said biasing force.

7. A radio antenna installation for aircraft comprising a reelable antenna, a reel for said antenna attached to the craft at a point convenient to the operator, means comprising a tortuous path for said antenna and extending from said reel to the point of departure of said antenna from said aircraft, a drag element affixed to the free end of said antenna and adapted to be presented to the air stream, and means for maintaining the drag of said element substantially constant irrespective of variations in the velocity of said air stream, whereby the reeling of said antenna along said tortuous path is facilitated.

WILLIAM D. VAN DYKE.